United States Patent
Hu et al.

(10) Patent No.: US 9,300,780 B2
(45) Date of Patent: Mar. 29, 2016

(54) PHONE

(71) Applicant: Boly Media Communications (Shenzhen) Co., Ltd., Shenzhen (CN)

(72) Inventors: Xiaoping Hu, Shenzhen (CN); Xia Shen, Shenzhen (CN); Lihua Chen, Shenzhen (CN)

(73) Assignee: Boly Media Communications (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/387,106

(22) PCT Filed: Feb. 1, 2013

(86) PCT No.: PCT/CN2013/071255
§ 371 (c)(1),
(2) Date: Sep. 22, 2014

(87) PCT Pub. No.: WO2013/139191
PCT Pub. Date: Sep. 26, 2013

(65) Prior Publication Data
US 2015/0087244 A1  Mar. 26, 2015

(30) Foreign Application Priority Data
Mar. 22, 2012 (CN) .......................... 2012 1 0077733

(51) Int. Cl.
*H04W 12/08* (2009.01)
*G08B 13/196* (2006.01)
*H04M 1/725* (2006.01)

(52) U.S. Cl.
CPC ......... *H04M 1/725* (2013.01); *G08B 13/19621* (2013.01); *G08B 13/19658* (2013.01);
(Continued)

(58) Field of Classification Search
CPC ... H04M 3/205; H04M 7/0078; H04W 12/08; H04B 17/00; G08B 13/19621; G08B 13/19695; G08B 13/19658
See application file for complete search history.

(56) References Cited

U.S. PATENT DOCUMENTS 7,031,436 B1 *  4/2006  Garey .................. H04M 11/04
                                                        379/37
8,417,217 B2 *  4/2013  Kasama ................. H04M 1/66
                                                        455/410

(Continued)

FOREIGN PATENT DOCUMENTS

CN     101064874 A     10/2007
CN     101179802 A     5/2008
(Continued)

OTHER PUBLICATIONS

International Search Report and Written Opinion from International Application No. PCT/CN2013/071255, mailed Apr. 25, 2013.

*Primary Examiner* — Andrew Wendell
(74) *Attorney, Agent, or Firm* — Alston & Bird LLP

(57) ABSTRACT

A phone comprises a shell, a first communication module for communicating via a first communication network, a detection signal acquisition component as well as a sensor chip and a processing module for security monitoring, wherein the first communication module, the sensor chip and the processing module are accommodated inside the phone shell, and the detection signal acquisition component is mounted on the surface of the phone shell. Due to the integration of additional components related to security monitoring, the phone disclosed herein becomes an integrated device with both functions of basic communication and security monitoring. In addition, the resulted phone with security monitoring function has good characteristics of stealth and invisibility.

14 Claims, 5 Drawing Sheets

(52) U.S. Cl.
CPC ..... *G08B13/19695* (2013.01); *H04M 1/72522* (2013.01); *H04W 12/08* (2013.01); *H04M 2250/12* (2013.01)

(56) References Cited

U.S. PATENT DOCUMENTS

| | | | | |
|---|---|---|---|---|
| 2003/0128130 | A1* | 7/2003 | Kao | G08B 13/19634 340/693.1 |
| 2007/0040676 | A1* | 2/2007 | Bandringa | G08B 29/183 340/567 |
| 2007/0182543 | A1* | 8/2007 | Luo | G08B 25/00 340/521 |
| 2009/0021375 | A1* | 1/2009 | Stagg | G06K 7/109 340/572.1 |
| 2009/0140854 | A1* | 6/2009 | Golander | G08B 13/2494 340/540 |
| 2011/0273292 | A1* | 11/2011 | Hayashide | G08B 29/18 340/555 |
| 2014/0305828 | A1* | 10/2014 | Salvo | G08B 13/1654 206/459.1 |

FOREIGN PATENT DOCUMENTS

| | | |
|---|---|---|
| CN | 101840700 A | 9/2010 |
| CN | 102710819 A | 10/2012 |
| CN | 202634541 U | 12/2012 |

\* cited by examiner

PHONE

TECHNICAL FIELD

The present disclosure relates to communication, more particularly, to phones.

PRIOR ART

Phones are a widely used communication tool. Generally different means of communication are employed in different places; for example, corded or cordless fixed-line telephones at home or in office, mobile phones when going out, etc. It is necessary to expand the functions of a phone employed in fixed places so as to enhance its capacity.

SUMMARY

A phone disclosed herein comprises a shell, a first communication module, a detection signal acquisition component, a sensor chip and a processing module; the first communication module is arranged to communicate through a first communication network; the detection signal acquisition component is arranged to acquire a detection signal; the sensor chip is arranged to sense the detection signal acquired by the detection signal acquisition component and generate a corresponding request signal; the processing module is arranged to receive a control signal turning on/off security monitoring function, perform turning on or off security monitoring function according to the control signal, and to receive the request signal generated by the sensor chip, perform recording and/or notifying security monitoring information according to the trigger of the request signal under the state that the security monitoring function is turned on; the first communication module, the sensor chip and the processing module are accommodated inside the shell, the detection signal acquisition component is mounted on the surface of the shell.

By adding related components for security monitoring, the phone disclosed herein becomes an integrated device with both functions of basic communication and security monitoring. In addition, since the phone itself is a common article, the phone with security monitoring function has good characteristics of stealth and invisibility.

Hereinafter is given embodiments of the phone according to the present disclosure with reference to the accompany drawings.

DETAILED DESCRIPTION

First Embodiment

Figure 1:
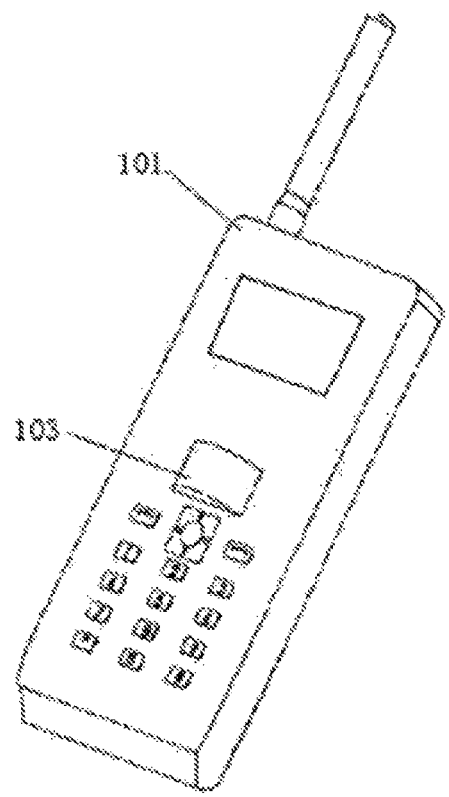
FIG. 1 is a schematic view showing the external structure of the phone according to an embodiment of the present disclosure.
Figure 2:
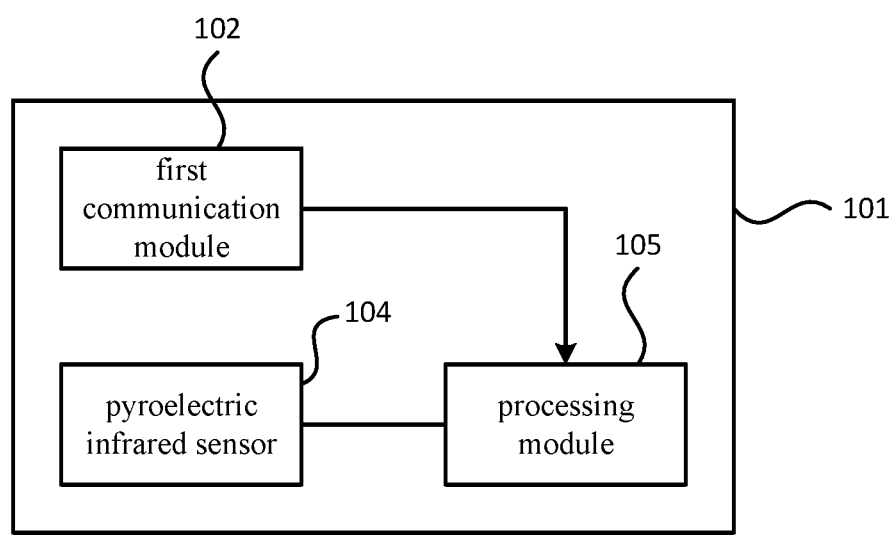
FIG. 2 is a schematic view showing the logic blocks of the phone shown in FIG. 1.

Referring to FIG. 1 and FIG. 2, a first embodiment of the phone according to the present disclosure comprises a shell 101, a first communication module 102, a Fresnel lens 103, a pyroelectric infrared sensor 104, and a processing module 105.

The first communication module 102, the pyroelectric infrared sensor 104 and the processing module 105 are accommodated inside the shell 101, and the Fresnel lens 103 is mounted on the surface of the shell 101.

The first communication module 102 arranged to communicate through a first communication network performs a conventional function of communication as a telephone. The type of the first communication module matches with the first communication network and can be a wireless or wired communication module. When using wireless communication, the first communication network may be the 2G, 3G or 4G mobile communication networks, or short-range wireless transmission network such as Bluetooth, wireless broadband (Wi-Fi), analog wireless signal communication, infrared signal communication, etc.; while using wired communication, the first communication network may be public switched telephone network (PSTN), integrated services digital network (ISDN), or internet telephony such as asymmetric digital subscriber line (ADSL), Ethernet, coaxial cable, or other internet protocol (IP) telephone network. The means of communication employed in the first communication module does not constitute the limits of the embodiment.

In this embodiment, an infrared sensing module composed of the Fresnel lens 103 and the pyroelectric infrared sensor 104 is adopted as a trigger module of security monitoring function, wherein the Fresnel lens 103 focuses the infrared signal of the monitoring area thereof, the pyroelectric infrared sensor 104 senses the infrared signal through a sensor placed at the focal of the Fresnel lens 103 and generates a corresponding request signal such as a signal indicates that a living body appears in the monitoring area. Since the conventional security monitoring function is used for intrusion detection of a living body, the trigger manner of monitoring based on infrared inspection can play a good role at monitoring. In other embodiments, other signals may also be adopted to be detection signals, such as sounds, images, video, temperature, humidity, etc., and for the selected detection signal, the detection signal acquisition component is configured correspondingly to be able to acquire such kinds of detection signal and a corresponding sensor sensing such signal is employed.

The processing module 105 is arranged to receive a control signal turning on/off security monitoring, perform turning on/off security monitoring function based on the control signal, and to receive the request signal sent by the pyroelectric infrared sensor 104, perform the operation of recording and/or notifying security monitoring information based on the trigger of the request signal under the state that the security monitoring function is turned on.

The security monitoring information referred in the embodiment comprises information related to security monitoring events triggered by the request signal, such as the time when a security monitoring event was triggered, the triggered event (i.e., "a security monitoring event happens"); further the security monitoring information may also comprise the data of audio, image and video (if any) related to security monitoring event. The processing module may not only record the information, but also transfer the information to user via various means known by user. For information with small amount of data, it will be recorded directly by the processing information, in other embodiments, if more detailed monitoring information or information with larger amount of data can be acquired, a corresponding storage device may also be employed. The manner informed by the processing module may be a simple sound, light warning, or may transfer the information to users (or related personnel, such as polices) via communication means.

The processing module, as a logical processor with security monitoring function, may be a microcomputer, a control chip, a central processor (CPU), etc. The control function of the processing module may be designed according to common requirements of security monitoring devices, such as, turning on/off monitoring function, processing information related to monitoring, interacting with users, and so on. The monitoring function turned on/off by the processing module can be implemented by turning on or off the pyroelectric infrared sensor (which may be the sensor corresponding to the detection signal in other embodiments), or by processing or neglecting the request signal sent by the sensor chip. Certainly, other ways may be adopted, for example, automatically turning on/off the monitoring function based on an opening/closing time preset by user, or setting specific buttons on the phone and the turning on/off of the monitoring function may be implemented by the triggered signal generated by pressing the button. Different ways of turning on/off monitoring function can be used independently or be used in combination.

In a specific implement, if a logical processor exists in the phone, the control function of the processing module can be integrated into the logical processor so as to simplify the structure, as the dotted line shown in FIG. 1. In this case, no logical connection may be existed between the telephony control function and the monitoring control function.

Second Embodiment

Figure 3:
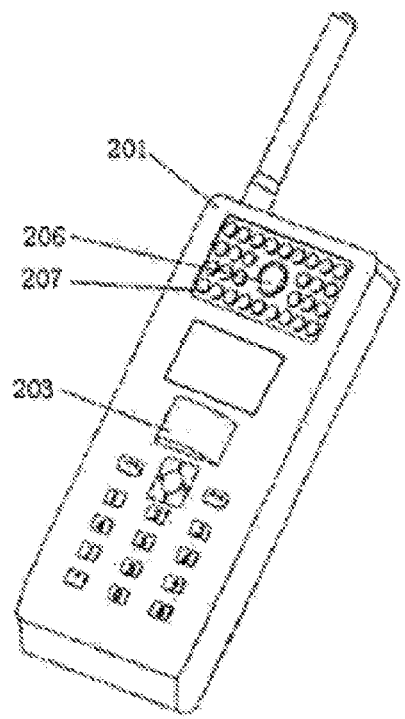
FIG. 3 is a schematic view showing the external structure of the phone according to another embodiment of the present disclosure.
Figure 4:
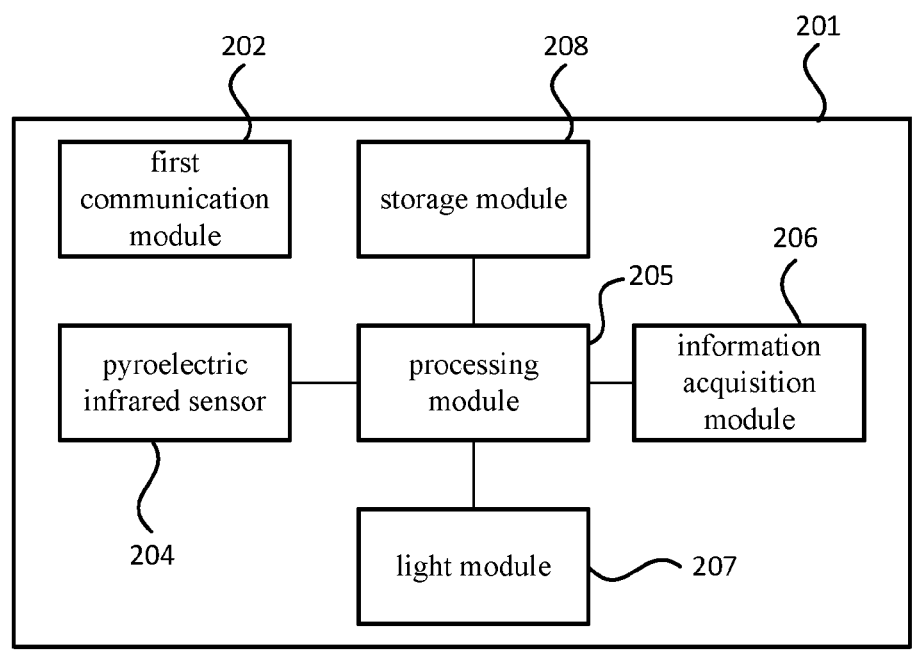
FIG. 4 is a schematic view showing the logic blocks of the phone shown in FIG. 3.

Referring to FIG. 3 and FIG. 4, the second embodiment of the phone according to the present disclosure comprises a shell 201, a first communication module 202, a Fresnel lens 203, a pyroelectric infrared sensor 204, a processing module 205, an information acquisition module 206, a light module 207 and a storage module 208.

The first communication module 202, the pyroelectric infrared sensor 204, as well as the processing module 205 and the storage module 208 are accommodated inside the shell 201, while the Fresnel lens 203, the information acquisition module 206 and the light module 207 are mounted on the surface of the shell 201.

The relationship among the first communication module 202, the Fresnel lens 203, the pyroelectric infrared sensor 204 and the processing module 205 in the embodiment is similar to that in the first embodiment, which will not be described herein. The difference between the embodiment and the first embodiment is that, a component which is able to acquire and store more detailed security monitoring information is added, comprising the information acquisition module 206, the light module 207 and the storage module 208.

The information acquisition module 206 is selected from one or more module of image acquisition module, video acquisition module and audio acquisition module, and may be selected based on actual monitoring needs; each information acquisition module is coupled with the processing module 205 via signal. A control function corresponding to the information acquisition module 206 is added in the processing module 205, that is, after receiving the request signal sent by the sensor chip 204, the processing module 205 controls the information acquisition module 206 to acquire information, such as taking pictures, recording sound and capturing video for the monitoring area; then the security monitoring information recorded and/or notified by the processing module 205 may further comprise information of image and/or video and/or audio acquired by the information acquisition module 206.

In order to improve the quality of the image data acquired by the information collection module 206, the light module 207 is added in the embodiment. The light module 207, electrically connected with the processing module 205, can be more than one infrared emitter, such as infrared light-emitting diodes (LEDs), of course, it may also be other types of lighting devices; the type of the light module 207 may be determined based on the requirement of the image sensor used in the information acquisition module 206. A control function corresponding to the light module 207 is added in the processing module 205, that is, during the information acquisition module 206 is controlled to acquire information, the processing module 205 controls the light module 207 to light information acquisition area.

Due to large amount of the security monitoring information acquired by the information acquisition module 206, a storage module 208 is added in the embodiment. The storage module 208 is coupled with the processing module 205 via signal. A control function corresponding to the storage module 208 is added in the processing module 205, that is, the information of image and/or video and/or audio acquired by the information acquisition module 206 is stored in the storage module 208.

Figure 5:
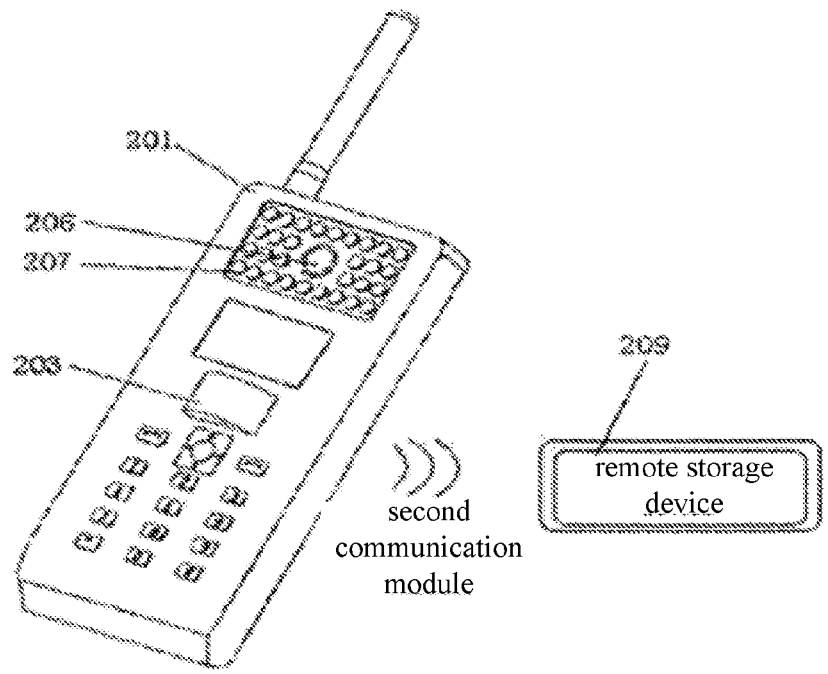
FIG. 5 is a schematic view showing the external structure of the phone according to another embodiment of the present disclosure.
Figure 6:
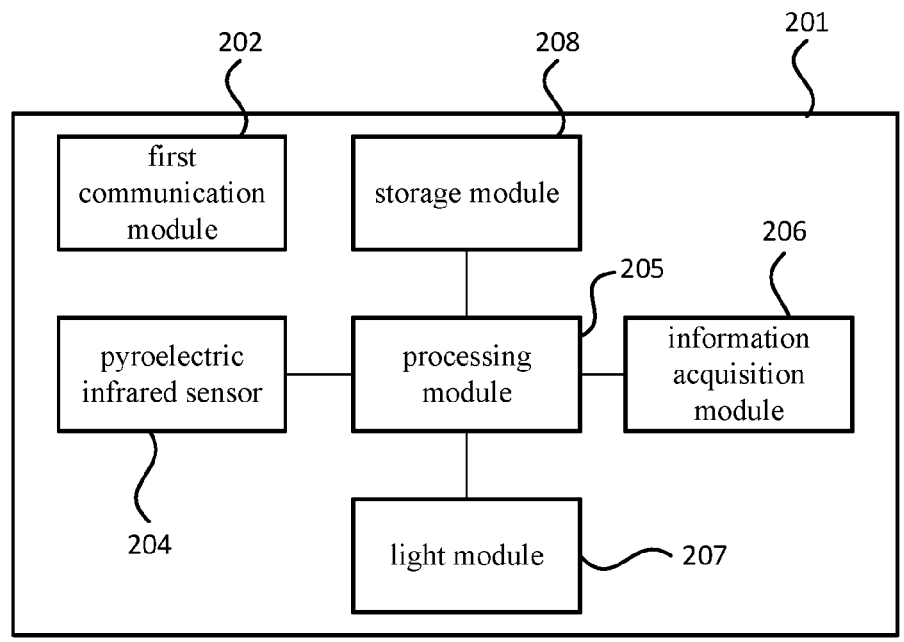
FIG. 6 is a schematic view showing the logic blocks of the phone shown in FIG. 5.

In other embodiments a remote storage device 209 may also be employed to store the security monitoring information, as shown in FIG. 5 and FIG. 6. In this case, a second communication module 210 which is coupled with the processing module 205 via signal is comprised. A control function corresponding to the second communication module 210 is added in the processing module 205, i.e., when needed to record security monitoring information, the processing module 205 controls the second communication module 210 to send the information of image and/or video and/or audio acquired by the information collection module 206 to the remote storage device 209 via a second communication network. If the physical distance between the storage device 209 and the processing module 205 is close, the second communication network may adopt communication modes identical to or different from those adopted in the first communication network, for example adopting short-range wireless transmission, such as Bluetooth, wireless broadband (Wi-Fi). If the storage device 209 is a device providing remote network storage, a corresponding access network may be adopted in the second communication network. The security of the stored monitoring information may be improved by using remote storage devices, even if the monitoring equipment (i.e., the embodiment of the phone) is stolen, the security monitoring information will not be lost.

Third Embodiment

Figure 7:
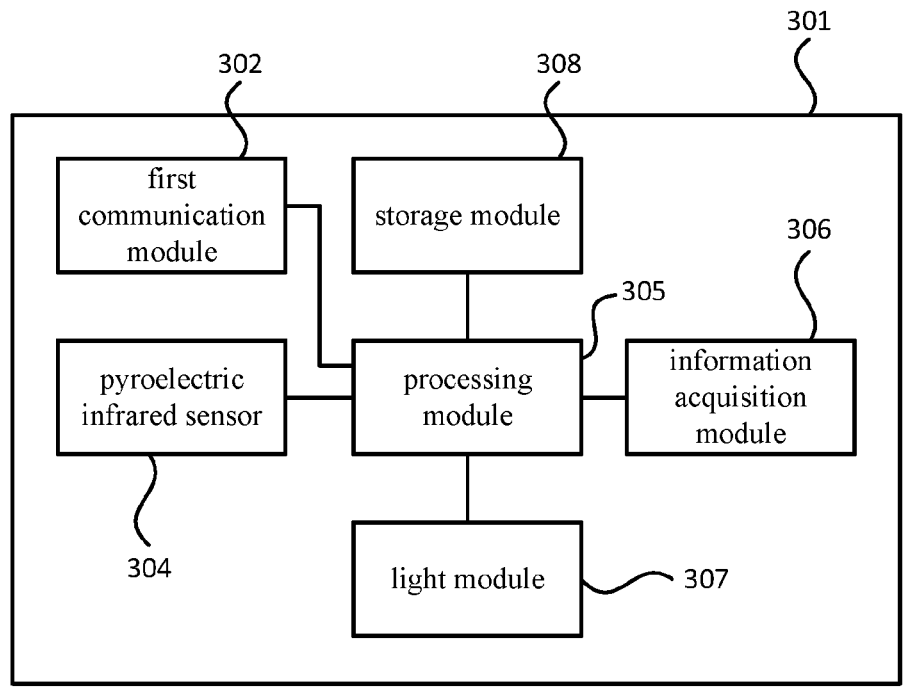
FIG. 7 is a schematic view showing the logic blocks of the phone according to another embodiment of the present disclosure.

Referring to FIG. 7, the third embodiment of the phone according to the present disclosure comprises a shell 301, a first communication module 302, a Fresnel lens, a pyroelectric infrared sensor 304, a processing module 305, an information acquisition module 306, a light module 307 and a storage module 308.

The first communication module 302, the pyroelectric infrared sensor 304, the processing module 305 and the storage module 308 are accommodated in the shell 301, while the Fresnel lens, the information acquisition module 306 and the light module 307 is mounted on the surface of the shell 301.

The relationship among the Fresnel lens, the pyroelectric infrared sensor 304, the information acquisition module 306, the light module 307, the storage module 308 and the processing module 305 in the embodiment is similar to that in the second embodiment, which will not be described herein. The difference between the embodiment and the second embodiment is that, the security monitoring functions is logically integrated with the telephone communication function.

In the embodiment the processing module 305 is coupled with the first communication module 302 via signal. A control function corresponding to the first communication module 302 is added in the processing module 305, i.e., when needed to notify the security monitoring information, the processing module 305 controls the first communication module 302 to dial a preset number to notify user or transmit security monitoring information to preset email addresses or network addresses based on the trigger of the request signal. Of course, the specific notified contents may be set according to requirement, such as sending description of security monitoring information in a text message, or sending pictures, videos acquired by the information acquisition module 306.

In the embodiment, the processing module 305 will turn on/off security monitoring according to the state of the first communication module, that is, the processing module 305 judges whether or not the first communication module 302 receives a normal communication request, if yes, it is regarded as a control signal of turning off security monitoring function, and goes on judging whether or not the first communication module 302 is transferred into standby mode (such as the first communication module does not respond to the incoming request, or ends communication after responding to the incoming request), if yes, it is regarded as a control signal turning on security monitoring function; or, judges the first communication module 302 receives a remote monitoring request, if yes, the instruction of the remote monitoring request is regarded as a control signal of turning on/off security monitoring function. Based on preset caller numbers, the first communication module 302 can differentiate a normal communication request or a remote monitoring request sent by a preset caller.

The embodiment takes full advantage of the functionality of the phone itself by integrating the logical control function of security monitoring and the communication function of the phone. In addition, by taking into account of the state of communication function when turning on/off security monitoring, false triggering of security monitoring function can be avoided when a subscriber uses the phone.

Fourth Embodiment

Figure 8:
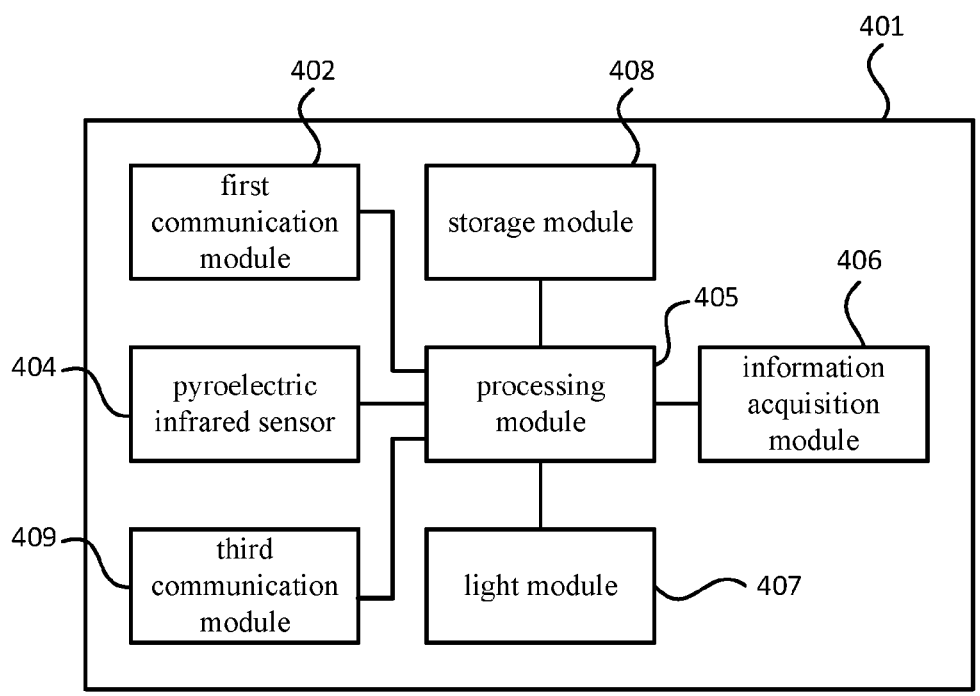
FIG. 8 is a schematic view showing the logic blocks of the phone according to another embodiment of the present disclosure.

Referring to FIG. 8, the fourth embodiment of the phone according to the present disclosure comprises a shell 401, a first communication module 402, a Fresnel lens, a pyroelectric infrared sensor 404, a processing module 405, an information acquisition module 406, a light module 407, a storage module 408, and a third communication module 409.

The first communication module 402, the pyroelectric infrared sensor 404, the processing module 405, the storage module 408 and the third communication module 409 are accommodated inside the shell 401, while the Fresnel lens, the information acquisition module 406 and the light module 407 are mounted on the surface of the shell 401.

The relationship among the first communication module 402, the Fresnel lens, the pyroelectric infrared sensor 404, the information acquisition module 406, the light module 407, the storage module 408 and the processing module 405 in the embodiment is similar to that in the third embodiment, which will not be described herein. The difference between the embodiment and the third embodiment is that, the phone is upgraded to be a security system from a single security monitoring equipment. For that, a third communication module 409 communicated with other security devices of the security system is added. The third communication module may employ commonly used means of communication, such as the 355M or 433M wireless communication.

The third communication module 409 is coupled with the processing module 405 via signal. A control function corresponding to the third communication module 409 is added in the processing module 405, for example, receiving a control signal turning on/off security monitoring sent by an external deployment control device (which may be a control center of a security system, such as a remote controller with an ability to send turning on/off command, of course, the deployment control device can also have other functions, such as providing user interface, etc.) via the third communication module, or receiving alarm signal sent by other security devices via the third communication module, and performing recording and/or notifying security monitoring information based on the trigger of the received alarm signal. In this case, security monitoring information may include alarm signals and/or the number of the security equipment sending the alarm signal. The number of the security equipment is used to mark the different devices in the security system, so as to control the devices separately and make an easily information exchanging therebetween. The number of the security equipment in the security monitoring information may also be used to indicate the type of alarm signal, such as the alarm signal sent by an access control or cross-line alarming device is usually presented as an event of invasion, the alarm signal sent by a fire sensor or smoke sensor is usually as an event of fire, and an alarm signal from gas leak detector may usually signal gas escaping. The communication means for the third communication module may use the same or different means as in the first communication module, which will not be described herein.

In the embodiment, a security system is formed by connecting the phone with security monitoring function with other types of security equipments, which perfects the security monitoring function.

Fifth Embodiment

Figure 9:
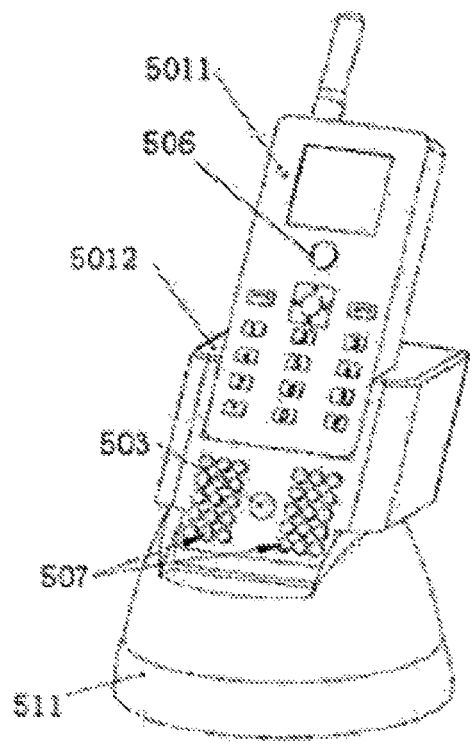
FIG. 9 is a schematic view showing the external structure of the phone according to another embodiment of the present disclosure.

Referring to FIG. 9, the fifth embodiment of the phone according to the present disclosure comprises: a shell, a first communication module, a Fresnel lens 503, a pyroelectric infrared sensor, a processing module, an information acquisition module 506, a light module 507, and a storage module. The phone in the embodiment comprises a body and a base, therefore the shell of the phone comprises a body shell 5011 and a base shell 5012.

In accordance with the structure of a normal cordless phone, the body provides a function of communication, the base provides a function of charging the body and a place to accommodate the body, so the first communication module is accommodated in the body shell 5011 in the embodiment. In addition, the processing module and the storage module are accommodated in the body shell 5011, the information acquisition module 506 is mounted on the surface of the body shell 5011, the pyroelectric infrared sensor is accommodated in the base shell 5012, the Fresnel lens 503 and the light module 507 are mounted on the surface of the base shell 5012. Interfaces are arranged respectively on the body shell 5011 and the base shell 5012 to connect the pyroelectric infrared sensor and the light module 507 to the processing module, so that when the body is placed on the base, the pyroelectric infrared sensor and the light module 507 will be connected to the processing module.

In the embodiment, the relationship among the first communication module, the Fresnel lens 503, the pyroelectric infrared sensor, the information acquisition module 506, the light module 507, as well as the storage module and the processing module is similar to that in the third embodiment, which will not be described herein. The difference between the embodiment and the third embodiment is that, the components added for security monitoring function are disposed on the base, which is suitable for the requirement of minimizing the body.

To make the security monitoring area adjustable, a holder 511, on which the base of the phone is located, is added in this embodiment. The holder 511 may be rotated automatically in accordance with a preset rule, but also be rotated under the control of the processing module. In other embodiments, if a security system is formed by the phone according to the present disclosure as well as other security devices (referring to the Fourth Embodiment), the processing module may also control the rotation of the holder based on the alarm signal sent by other security devices, so that the information acquisition module can face the area needed to be monitored.

Figure 10:
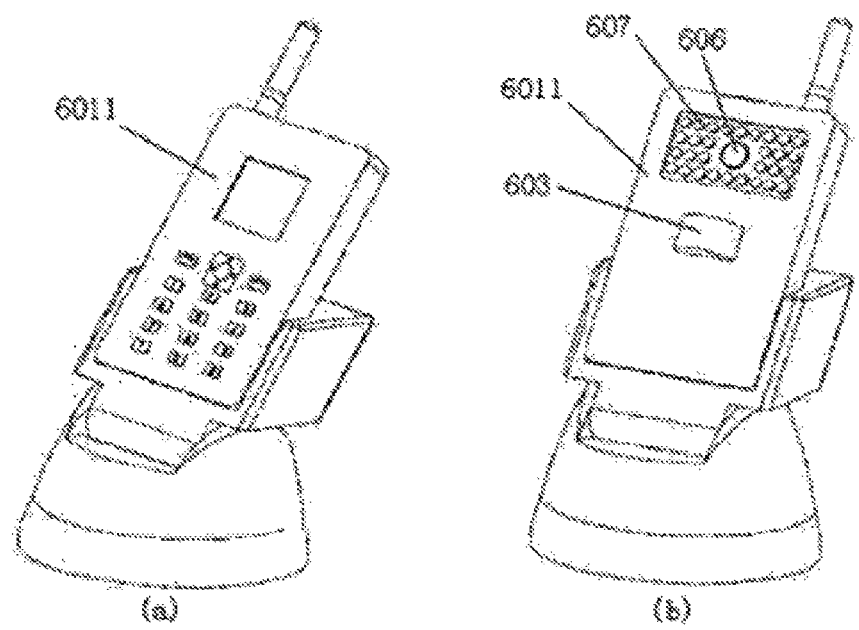
FIG. 10 is a schematic view showing the external structure of the phone according to an embodiment of the present disclosure, in which (a) schematically shows the front of the body, and (b) schematically shows the back of the body.

In other embodiments, the Fresnel lens, the pyroelectric infrared sensor, the processing module, the information acquisition module as well as the storage module can also be disposed on the body and the base by other ways. For example, as shown in FIG. 10, the Fresnel lens 603, the information acquisition module 606 and the light module 607 are arranged on the body, however, if they are arranged on the back of the body shell 6011, the imperceptibility of the phone as a security device will be higher. If the components needed to be connected therebetween are not located at a same part, the interfaces used to connect the corresponding components may be arranged on the body shell and the base shell respectively, the body is required to be disposed on the base (so as the corresponding interfaces can be matched), thus the body and the base can be regarded as a whole to complete the connection between the corresponding components. Furthermore, by detecting whether the connected component is located at the same shell or not, the processing module judges whether or not the body is arranged at the base, which is regarded as a control signal turning on/off security monitoring, so that the control of monitoring may become more convenient and flexible.

It should be noted that, the above described embodiments serve only to help to understand the present disclosure, but not to limit the protection scope of the present disclosure. It will be apparent to those of ordinary skill in the art that various modifications and variations can be made without departing from the scope or spirits of the present disclosure.

The invention claimed is:

1. A phone, comprising: a shell and a first communication module,
the first communication module for communicating through a first communication network,
further comprising:
a detection signal acquisition component for acquiring detection signals,
a sensor chip for sensing the detection signals and generating a corresponding request signal, and
a processing module for receiving a control signal of turning on/off security monitoring function, performing turning on/off security monitoring function based on the control signal, and for receiving the request signal, performing recording and/or notifying security monitoring information based on a trigger of the request signal in an on state of security monitoring,
wherein the first communication module, the sensor chip and the processing module are accommodated inside the shell, and the detection signal acquisition component is mounted on the surface of the shell, wherein
the processing module is coupled with the first communication module via signals;
the processing module receives the control signal of turning on/off security monitoring function, comprising: judging whether or not the first communication module receives a normal communication request, if yes, the state of the first communication module is regarded as a control signal of turning off security monitoring function, and goes on judging whether the first communication module is in standby mode, if yes, the state of the first communication module is regarded as a control signal of turning on security monitoring function or, judging whether or not the first communication module receives a remote monitoring request, if yes, the instruction of the remote monitoring request is regarded as a control signal of turning on/off security monitoring function;
the detection signal acquisition component comprises a Fresnel lens;
the sensor chip is a pyroelectric infrared sensor; and
the trigger of the request signal comprises a detection at the focal of the Fresnel lens.

2. The phone as claimed in claim 1, wherein
the processing module is coupled with the first communication module via signals, and
the processing module performs notifying security monitoring information based on the trigger of the request signal by means of controlling the first communication module to dial a preset phone number to notify user or transmit security monitoring information to preset email addresses or network addresses based on the trigger of the request signal.

3. The phone as claimed in claim 1, further comprising: an information acquisition module mounted on the surface of the shell and selected from one or more information acquisition module including image acquisition module, video acquisition module and audio acquisition module, each information acquisition module is coupled with the processing module via signal,
the processing module performing recording and/or notifying security monitoring information based on the trigger of the request signal comprises: after receiving the request signal, the processing module controls the information acquisition module to acquire information, and records the information of image and/or video and/or audio acquired by the information acquisition module, or notify user with the information of image and/or video and/or audio acquired by the information acquisition module.

4. The phone as claimed in claim 3, further comprising a light module mounted on the surface of the shell, wherein
the light module is electrically connected with the processing module, and
the processing module controls the information acquisition module to acquire information, as well as controlling the light module to illuminate information acquisition area.

5. The phone as claimed in claim 4, wherein the light module comprises one or more infrared emitters.

6. The phone as claimed in claim 3, further comprising a storage module, wherein
the storage module is connected with the processing module via signal, and
the processing module recording the information of image and/or video and/or audio acquired by the information acquisition module comprises: storing the information of image and/or video and/or audio acquired by the information acquisition module into the storage module.

7. The phone as claimed in claim 3, further comprising a second communication module, wherein
the second communication module is coupled with the processing module via signal, and
the processing module recording the information of image and/or video and/or audio acquired by the information acquisition module comprises: controlling the second communication module to transmit the information of image and/or video and/or audio acquired by the information acquisition module via a second communication module to a remote storage device to be stored.

8. The phone as claimed in claim 1, further comprising a third communication module, wherein
the third communication module is coupled with the processing module via signal, and
the processing module receiving a control signal turning on/off security monitoring function comprises: receiving a control signal turning on/off security monitoring function sent by external deployment control devices via the third communication module.

9. The phone as claimed in claim 1, wherein the processing module is also arranged to receive alarm signals sent by other security device via the third communication module, and perform recording and/or notifying security monitoring information based on the trigger of the request signal, the security monitoring information comprises the alarm signal and/or the number of the security device sending the alarm signal.

10. The phone as claimed in claim 1, wherein
the phone comprises a body and a base,
the shell comprises a body shell and a base shell,
the first communication module accommodated inside the shell comprises: the first communication module is accommodated inside the body shell,
the sensor chip and the processing module accommodated inside the shell comprises: the sensor chip is accommodated inside the body shell or the base shell, the processing module is accommodated inside the body shell or the base shell, and
the detection signal acquisition component mounted on the surface of the shell comprises: the detection signal acquisition component is mounted on the surface of the body shell or the base shell.

11. The phone as claimed in claim 10, further comprising a holder, wherein the base is mounted on the holder, and the processing module is also arranged to control the rotation of the holder.

12. The phone as claimed in claim 1, wherein the trigger of the request signal comprises detection of a body.

13. The phone as claimed in claim 12, wherein the trigger of the request signal comprises detection of a living body.

14. The phone as claimed in claim 1, wherein the trigger of the request signal comprises infrared inspection.

* * * * *